(12) United States Patent
Valdemarsson et al.

(10) Patent No.: US 7,622,829 B2
(45) Date of Patent: Nov. 24, 2009

| (54) | ROTATING ELECTRIC MOTOR FOR OPERATING AN ELECTRIC COMPONENT |
|---|---|
| (75) | Inventors: Stefan Valdemarsson, Lidköping (SE); Lars Liljestrand, Västerås (SE); Philip Kjaer, Århus C (DK) |
| (73) | Assignee: ABB Research Ltd., Zürich (CH) |
| ( * ) | Notice: Subject to any disclaimer, the term of this patent is extended or adjusted under 35 U.S.C. 154(b) by 201 days. |
| (21) | Appl. No.: 10/571,462 |
| (22) | PCT Filed: Sep. 10, 2004 |
| (86) | PCT No.: PCT/IB2004/002945 § 371 (c)(1), (2), (4) Date: Nov. 28, 2006 |
| (87) | PCT Pub. No.: WO2005/024877 PCT Pub. Date: Mar. 17, 2005 |
| (65) | Prior Publication Data US 2007/0096682 A1 May 3, 2007 |
| (30) | Foreign Application Priority Data |
|  | Sep. 11, 2003 (SE) .................... 0302430 |
| (51) | Int. Cl. *H02K 29/02* (2006.01) |
| (52) | U.S. Cl. .................... 307/139; 318/696 |
| (58) | Field of Classification Search .............. None See application file for complete search history. |
| (56) | References Cited |

U.S. PATENT DOCUMENTS

| 3,555,389 | A | * | 1/1971 | Opal ........................ 388/830 |
| 3,786,326 | A | * | 1/1974 | Hubner .................. 318/400.11 |
| 3,837,419 | A | * | 9/1974 | Nakamura ................. 180/65.4 |
| 3,845,379 | A | * | 10/1974 | Kawamata et al. .......... 388/830 |
| 3,968,420 | A | * | 7/1976 | Yoshida .................... 363/124 |
| 4,025,836 | A | * | 5/1977 | Naito et al. ................. 318/490 |
| 4,134,038 | A | * | 1/1979 | Kosak et al. ............... 318/245 |
| 4,156,899 | A | * | 5/1979 | Matsuda et al. ............. 363/138 |
| 4,262,614 | A | * | 4/1981 | Sugaya et al. .............. 112/451 |

(Continued)

FOREIGN PATENT DOCUMENTS

CN       1301394 A       6/2001

(Continued)

OTHER PUBLICATIONS

Second Office Action from the State Intellectual Property Office of People's Republic of China, dated Jul. 3, 2009, issued in connection with counterpart China Application No. 200480025930.7.

*Primary Examiner*—Stephen W Jackson
*Assistant Examiner*—Adi Amrany
(74) *Attorney, Agent, or Firm*—Venable LLP; Eric J. Franklin

(57) ABSTRACT

A rotating electric motor for operating an electric component. The motor is arranged for an operating movement during a limited predetermined angular motion of the rotor of the motor. An electric drive circuit is arranged for the winding of the motor. The electric circuit exhibits at least one branch including an electric energy bank and a thyristor, which are connected in series with the motor winding. Also, a method for breaking, a use of the motor, and an electric switch provided with the motor.

16 Claims, 6 Drawing Sheets

U.S. PATENT DOCUMENTS

| | | | |
|---|---|---|---|
| 4,284,934 A * | 8/1981 | Narita et al. | 388/819 |
| 4,394,606 A * | 7/1983 | Woerwag | 318/434 |
| 4,428,023 A * | 1/1984 | Maier | 361/100 |
| 4,445,077 A * | 4/1984 | Kirschner | 318/696 |
| 4,475,068 A * | 10/1984 | Brailsford | 318/400.39 |
| 4,563,619 A * | 1/1986 | Davis et al. | 318/254.1 |
| 4,602,701 A * | 7/1986 | Tanahashi | 187/296 |
| 4,843,533 A * | 6/1989 | Roof et al. | 363/55 |
| 5,298,848 A * | 3/1994 | Ueda et al. | 318/811 |
| 5,689,164 A * | 11/1997 | Hoft et al. | 318/701 |
| 6,144,235 A | 11/2000 | Marano et al. | |
| 6,713,984 B1 | 3/2004 | Valdemarsson | |
| 2001/0006144 A1 | 7/2001 | Sfondrini et al. | |
| 2003/0150841 A1 | 8/2003 | Magnussen et al. | |

FOREIGN PATENT DOCUMENTS

| | | | |
|---|---|---|---|
| DE | 0057378 | * | 1/1982 |
| WO | WO 00/36621 | | 6/2000 |
| WO | WO 01/71741 A1 | | 9/2001 |
| WO | WO 02/056326 A1 | | 7/2002 |

* cited by examiner

ROTATING ELECTRIC MOTOR FOR OPERATING AN ELECTRIC COMPONENT

CROSS-REFERENCE TO RELATED APPLICATIONS

This application claims priority to Swedish patent application no. filed 11 Sep. 2003 and is the national phase under 35 U.S.C. § 371 of PCT/IB1B2004/002945.

FIELD OF THE INVENTION

The present invention relates, from a first aspect, to a rotating electric motor for operating an electric component, said motor being arranged for an operating movement during a limited predetermined angular motion of the rotor of the motor, and said motor comprising an electric drive circuit for the stator winding of the motor.

From a second aspect, the invention relates to a method for operating an electric component through an angular motion achieved by a rotating electric motor, the rotor of which is connected to the electric component, the rotor being brought to carry out a limited predetermined angular motion by driving a current through the stator winding of the rotor.

From a third aspect, the invention relates to a use of the invented rotating electric motor, and from a fourth aspect the invention relates to an electric switch.

BACKGROUND ART

Certain electrical components are of a kind which are to carry out an operating movement of a limited extent but for a very short period of time. This makes demands on a drive means which may be rapidly activated, accelerated and decelerated during the short time during which the operating movement is to be carried out. One typical example of such a component is a switch, especially for high and medium voltage. The operation of such a switch is conventionally performed using a mechanical spring as drive source. When breaking is required, the mechanical energy stored in the spring is released, thus obtaining rapid breaking. However, the use of spring means for operating the switch entails certain disadvantages. In the light of these facts, alternative solutions have been arrived at, wherein a rotating electric motor is used for the operation of the switch. Examples of this are described in WO 00/36621 and WO01/71741.

In the switch according to WO00/36621, driving current for the motor is obtained from a source of energy via a control unit. In the switch according to WO01/71741, a converter is used, via which the motor is connected to a source of energy such as, for example, a capacitor bank.

Another example of an electrical component where a limited angular motion in a short time is required is the type of commutating electric switching device disclosed in WO02/056326. Here, the electric switching device comprises a number of movable contact members which are to be rotated rapidly and simultaneously through 90°. For the operation of this movement, an electric motor is described as one embodiment.

The equipment described in the known examples for achieving a rapid and limited operating movement of the motor is relatively costly. Therefore, there is a need to improve the devices according to the prior art.

In the light of the above, the object of the present invention is to provide a rotating electric motor of the kind in question, in which a rapid and limited movement of the motor is provided in a simple, inexpensive and reliable manner.

SUMMARY OF THE INVENTION

The object set up is achieved, according to a first aspect of the invention, in that a rotating electrical machine exhibits the special features that the drive circuit for the stator winding of the motor exhibits at least one branch which includes an electric energy bank and a thyristor which are connected in series with the stator winding.

By connecting the energy bank to the motor winding via a thyristor, the drive circuit for the motor winding will be considerably simpler and less expensive compared with the prior art. The need of a costly converter is eliminated and the control equipment becomes simpler.

According to a preferred embodiment of the invented rotating electric motor, the energy bank comprises capacitor means. This is an effective, inexpensive form of energy storage that is well adapted to deliver a relatively large quantity of electrical energy as is the case in the present invention.

According to another preferred embodiment, each branch comprises a diode connected in parallel with the energy bank. This facilitates, in a simple manner, achieving deceleration of the motor as well as preventing reversed polarity of the capacitor in those cases where the energy bank consists of electrolytic capacitors.

According to still another preferred embodiment, the thyristor is arranged to be turned off when the rotor has carried out less than a good half of the angular motion. By "a good half" is meant half the angular motion plus up to 10°. This gives the rotor a strong movement pulse, providing a fast acceleration during the first half of the movement, and prevents reversed polarity of the capacitor in those cases where the energy bank consists of electrolytic capacitors.

According to yet another preferred embodiment, the thyristor is arranged to be turned on again after having been turned off. This permits a controlled deceleration movement to be achieved in a simple manner during the second half of the operating movement.

According to a further preferred embodiment, said angular motion is about 155-205°. When the motor is used for operating a switch, an appropriate embodiment therefor is that the transmission of the rotational movement of the rotor to the translatory movement of the movable member of the switch is achieved by a crank arm that is turned about half a turn. With the stated magnitude of the rotational movement of the rotor, the motor is especially suitable for such an application and eliminates the need of mechanical gear change of the movement. It is especially advantageous if the angle is about 180°.

According to another preferred embodiment, the thyristor is arranged to remain turned on until the energy bank is exhausted.

According to an additional preferred embodiment, the drive circuit comprises three branches of the described kind, and these are connected in parallel. When the motor is used for operating a switch, there is often a need to carry out three operating movements in a short time, namely, break-make-break movements. It is a matter of a period of time of less than half a second. If, for example, a capacitor bank is used as energy bank, such a bank will not have time to be charged in this short period since normally a charging time of several seconds must be counted on. By designing the drive circuit with three parallel branches, wherein each branch may be activated for a respective one of the operating movements, it is ensured in a simple manner that these may be carried out without any delay caused by waiting for recharging.

The above-mentioned and other advantageous embodiments of the invented rotating electric motor are described herein.

From the second aspect of the invention, the object set has been achieved in that a method that includes the special measures that the stator winding of the motor is connected via a thyristor to an energy bank.

According to preferred embodiments of the invented method, it is carried out while using a rotating electric motor according to the invention or any of the preferred embodiments thereof.

With the invented method and preferred embodiments thereof, advantages of the kind corresponding to those described above for the invented electric motor and its preferred embodiments are gained.

With the invented use and the invented electric switch advantages corresponding to those describe above are gained.

BRIEF DESCRIPTION OF THE DRAWINGS

The invention will be explained in greater detail by the following detailed description of advantageous embodiments thereof and while referring to the accompanying drawings.

DETAILED DESCRIPTION OF EMBODIMENTS OF THE INVENTION

Figure 1:
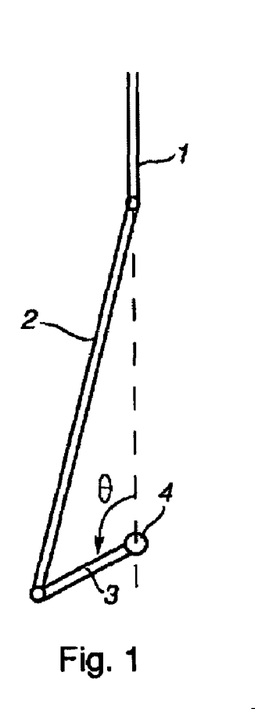
FIG. 1 is a schematic illustration of part of the movement transmission mechanism between a switch and a motor according to a first embodiment of the invention.

FIG. 1 schematically illustrates a typical application of a rotating electric motor according to the invention. The figure represents a movement transmission mechanism between the motor and the movable contact member of a switch, for example a vacuum switch. Numeral 1 designates an operating rod that is rigidly connected to the movable member of the switch. Numeral 4 designates the output rotor shaft of the rotor, and numerals 2 and 3 are a linkage. The rod 2 is articulately connected at one end to the operating rod 1 and at its other end to a crank 3. The crank 3 is, at its opposite end, rigidly connected to the rotor shaft 4. The switch is in the closed position at the upper end position, at which the crank 3 is directed perpendicularly upwards from the rotor shaft and aligned with the rods 1 and 2. In this position, the angle of deflection $\theta=0$ and is considered positive in the direction of the arrow. The operation of the switch from its closing position to its breaking position takes place by rotating the rotor shaft 4 from $\theta=0$ to $\theta=180°$. This takes place by driving a current through the stator winding of the rotor for a short time.

Figure 2:
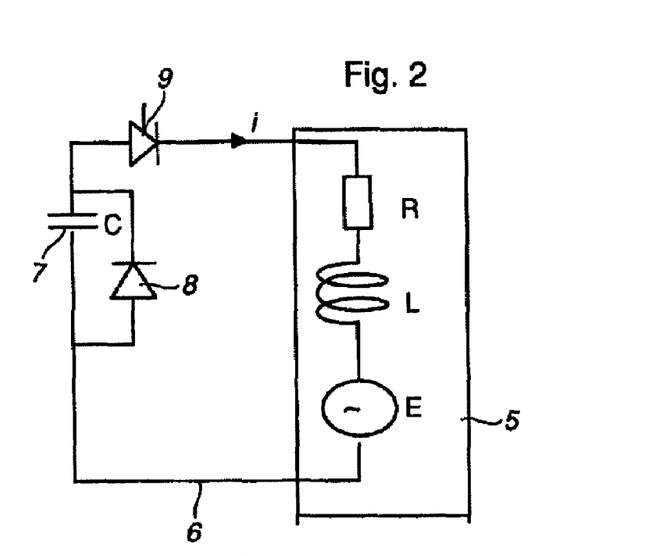
FIG. 2 is a diagram for the drive circuit of the stator winding according to a first example of a motor according to the invention.

FIG. 2 illustrates the drive circuit that activates the motor. The motor 5 is a single-phase motor with only one winding turn in the stator and with a permanent-magnetic rotor. The stator winding is connected to a drive circuit 6 with an energy bank consisting of a capacitor bank 7. Further, the circuit comprises a thyristor 9. Connected in parallel with the capacitor bank 7 is a diode. The stator winding may be electrically represented by a resistance R, an inductance L and a voltage E induced by the permanent-magnetic rotor.

During states that require operation of the switch, a turn-on signal is supplied to the thyristor 9 so that a current i starts flowing from the capacitor bank 7 through the stator winding 5. A torque is thus generated on the rotor so that the rotor rotates the crank bar 3 (see FIG. 1) from the angular position $\theta=0°$, and the breaking movement for the movable contact member of the switch is initiated.

Soon after the angular position $\theta=90°$ is achieved, the braking phase is started by turning on the thyristor again. This again leads to the generation of a current i because of the voltage E induced in the winding 5. The current now flows through the diode 8 in the same direction as before, the torque $T_m$ on the rotor 5 thus being reversed. The movement of the movable contact member thus becomes decelerated during this phase of the process. The braking energy is substantially absorbed by the resistance in the motor winding. The braking movement proceeds to an angular position of approximately $\theta=180°$.

During operation, no closer control of the movement process is exercised. This process is determined only by the fact that an impulse for acceleration is delivered during the first phase of the movement and that the movement is braked during its latter phase. However, it may be suitable to arrange a time control for controlling the point in time for turn-off of the thyristor 9 and for controlling the time interval between its turn-off and renewed turn-on. Also, control of the capacitance of the capacitor bank may be desirable.

Figure 3:
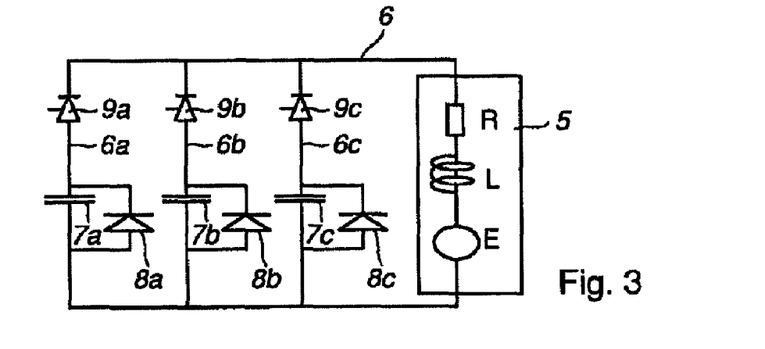
FIG. 3 is a corresponding diagram for a second example.

FIG. 3 illustrates a drive circuit 6 corresponding to that shown in FIG. 2 but arranged to allow an operating cycle of the switch to break-make-break during a short time interval, about 0.5 seconds or less. The drive circuit 6 comprises three parallel branches 6a-6c, each one composed in a manner corresponding to that of the drive circuit in FIG. 2. Each branch 6a etc thus comprises a thyristor 9a etc., a capacitor bank 7a etc., and a diode 8a etc., connected in parallel with the capacitor bank. To achieve breaking, the thyristor 9a in the first branch 6a is turned on and the process described with reference to FIG. 2 is carried out. Then, to close the switch again, the thyristor 9a in the branch 6b is turned on, whereby the process is, in principle, repeated but with the difference that the movement now takes place from the angular position $\theta=180°$ to $\theta=0°$. The next breaking movement then occurs by driving from the circuit 6c in a corresponding way.

Figure 4:
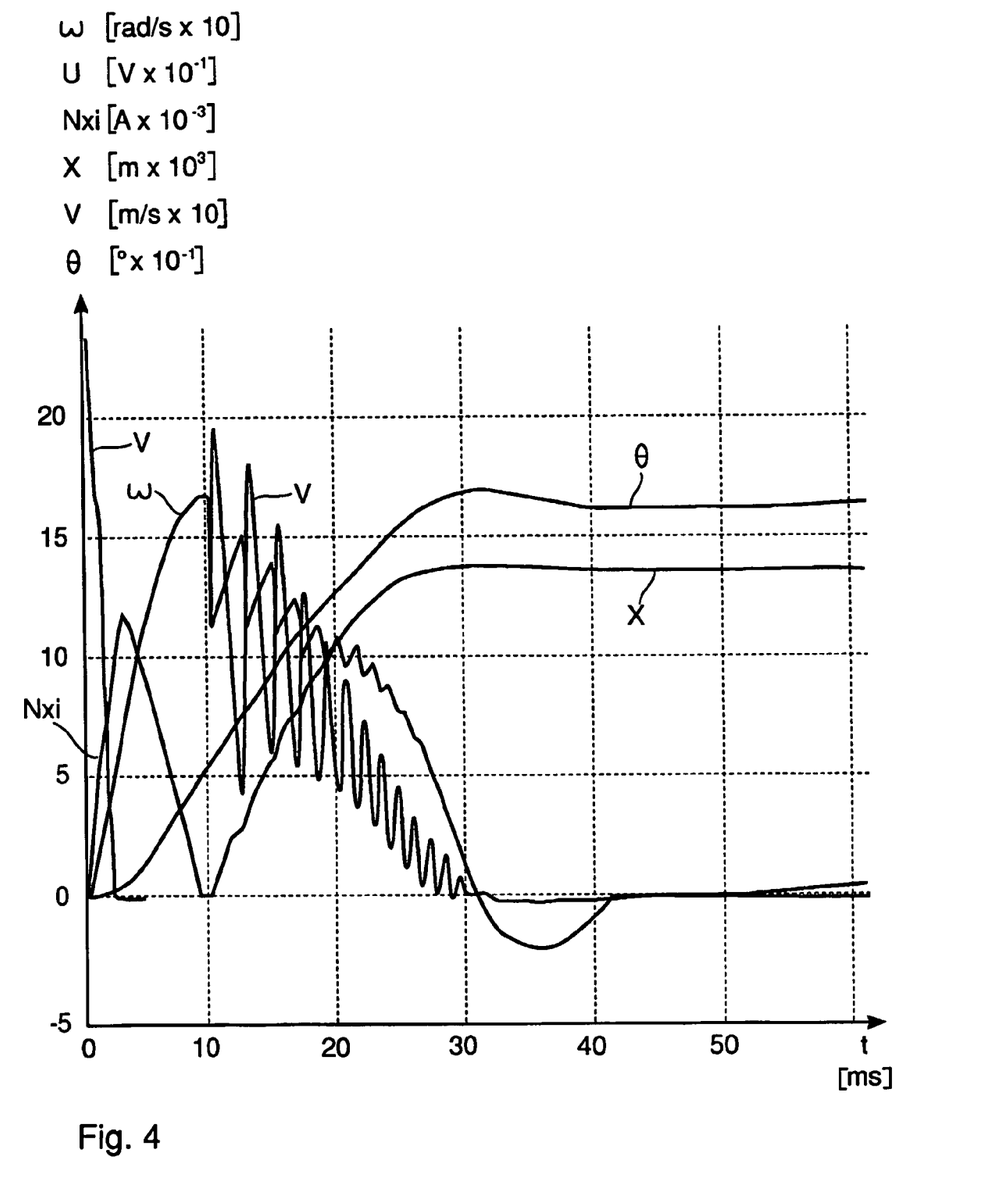
FIG. 4 is a graph illustrating different cycles in the motor during an operating movement for breaking of a switch.
Figure 5:
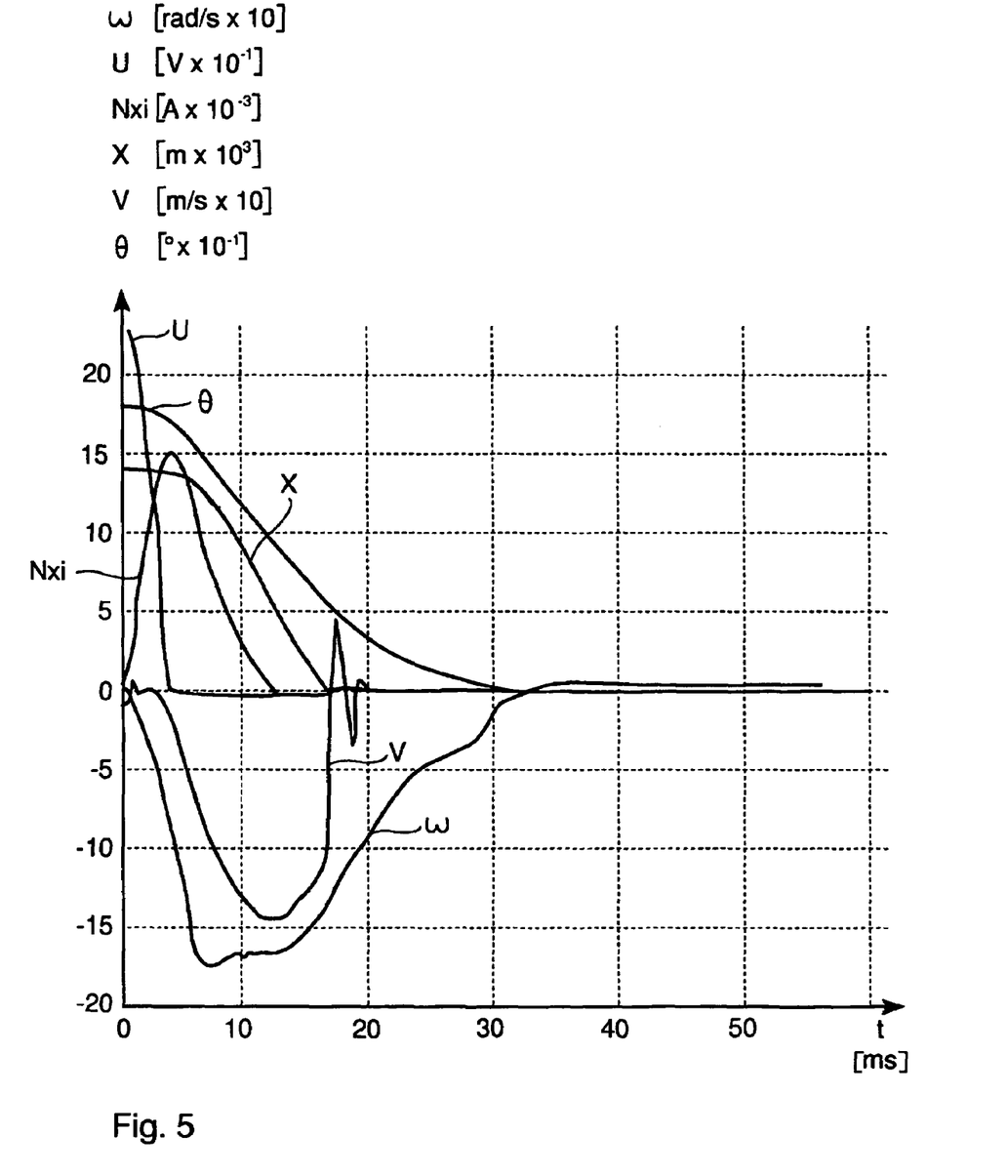
FIG. 5 is a corresponding graph illustrating closing of a switch.

The process for breaking and closing of a switch is illustrated in the diagrams in FIGS. 4 and 5. The diagrams are based on a simulation related to a three-phase vacuum switch made by ABB and designated VK 32425-31.5. The movement transmission mechanism is of the type illustrated in FIG. 1 but with three operating rods connected to the motor shaft, each phase switch being operated by a respective rod. The following data are used:

Rotor diameter: 30 mm.
Rotor length: 200 mm.
Winding resistance: 0.083 ohms.
Winding inductance: 1.3 mH.
Number of winding turns: 40.
Mass of movable contact member: 2.43 kilos.
Capacitance of capacitor bank: 4 mF.
Voltage of capacitor bank: 250 V.

In the diagrams, the abscissa indicates time in ms from the turn-on of the thyristors 6a and 6b (see FIG. 3), respectively, for initiation of the respective operating movement. The ordinate indicates the speed of the rotor=$\omega$, the voltage of the capacitor bank=U, the product of the number of winding turns in the stator and the current intensity=Nxi, the transfer of the movable contact member from its closing position=x, the velocity of the movable contact member in the x-direction=V, and the angle of rotation=θ, defined in accordance with FIG. 1. The ordinate denotes in which unit the respective variable is indicated.

FIG. 4 illustrates the breaking operation, which takes about 30 ms. The crank rod 3 in FIG. 1 has then been turned from its upper position where θ=0 to a lower almost diametrical end position where θ=170°. The capacitor voltage drops rapidly from the initial 250 V and reaches zero after about 4 ms. Contact separation occurs at about 10 ms, whereby strong fluctuations in speed and position occur. However, these are exaggerated since the simulation model did not consider the damping of these oscillations that occurs in reality. The thyristor is turned on again at about 20 ms, whereby the motor is short-circuited and the deceleration of the movement starts. The fact that the end position occurs at θ=170°, that is, somewhat before a completed half-turn, is due to the braking phase having started somewhat too early.

FIG. 5 illustrates, in a corresponding way, the closing operation. The movement occurs from θ=180° to θ=3°. The end position may be fluctuated several degrees around the zero position because of friction forces in the mechanical system. Turn-off of the thyristor occurs at about 12.5 ms when the current intensity passes through zero. The thyristor is then turned on again for braking after about 25 ms. At about 17 ms, the contact members of the switch start getting into contact with each other, whereby bouncing occurs as is clear from the v-curve at this stage.

Figure 6:
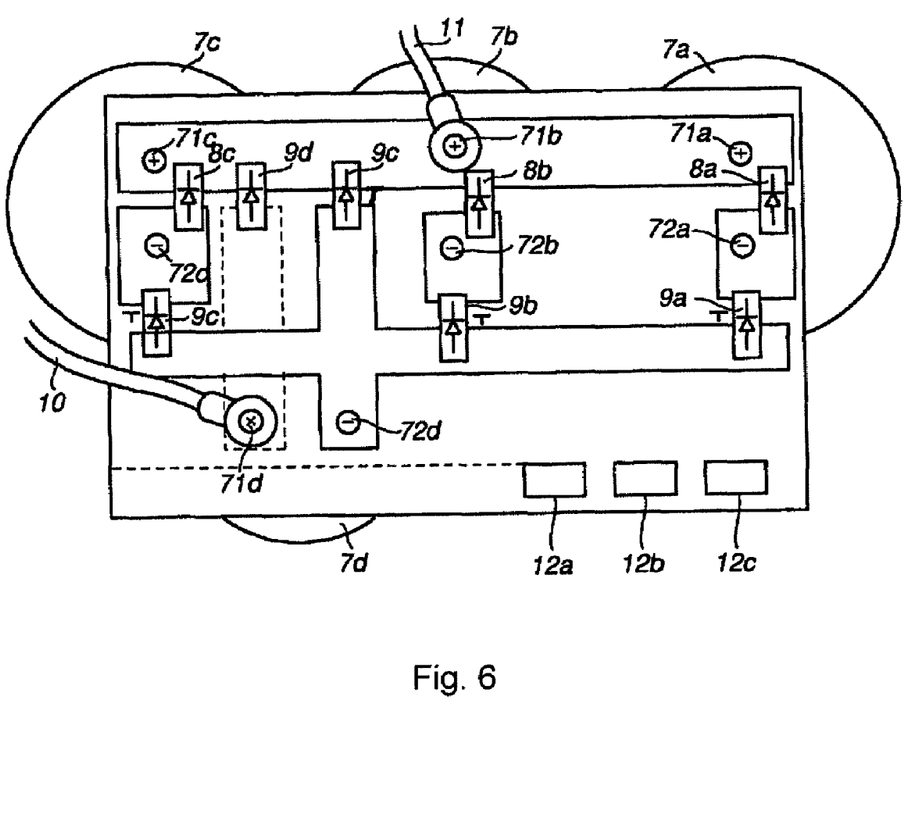
FIG. 6 illustrates an example of a drive unit for a motor according to the invention.

FIG. 6 shows a unit for driving the motor which, in principle, corresponds to the diagram shown in FIG. 3, but with the difference that a fourth capacitor bank 7d is included in the drive circuit. Numerals 10 and 11 designate connections to the motor. The three capacitor banks 7a, 7b and 7c are arranged for the break-make-break operations described with reference to FIG. 3. Numerals 71a, 72a etc. designate the positive and negative sides of the respective capacitor bank. The fourth capacitor bank 7d is connected to the circuit via two thyristors 9d and 9e. This is arranged to be discharged to ensure that the operating movement reaches the end position. A turn-on signal is supplied to the respective thyristors 9a, 9b and 9c, respectively, through the lines 12a, 12b, 12c to initiate the respective operating movement.

Figure 7:
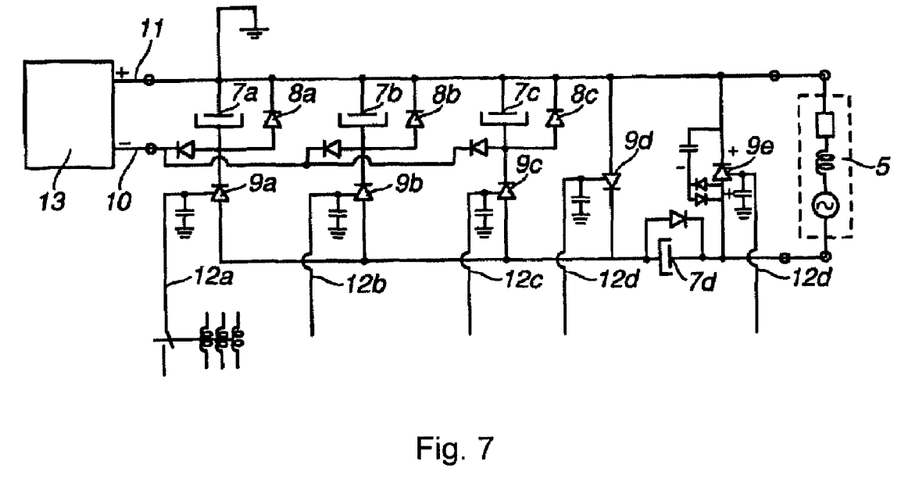
FIG. 7 is a circuit diagram for the drive unit of FIG. 6.

FIG. 7 is a circuit diagram illustrating the unit shown in FIG. 6, connected together with the stator winding. The thyristor 9e for braking is turned on by means of the signalling circuit 12e, and the thyristor 9d for discharging the capacitor bank 7d to achieve the end position is turned on by means of the signalling circuit 12d. Power supply is obtained from the current source 13.

Figure 8:
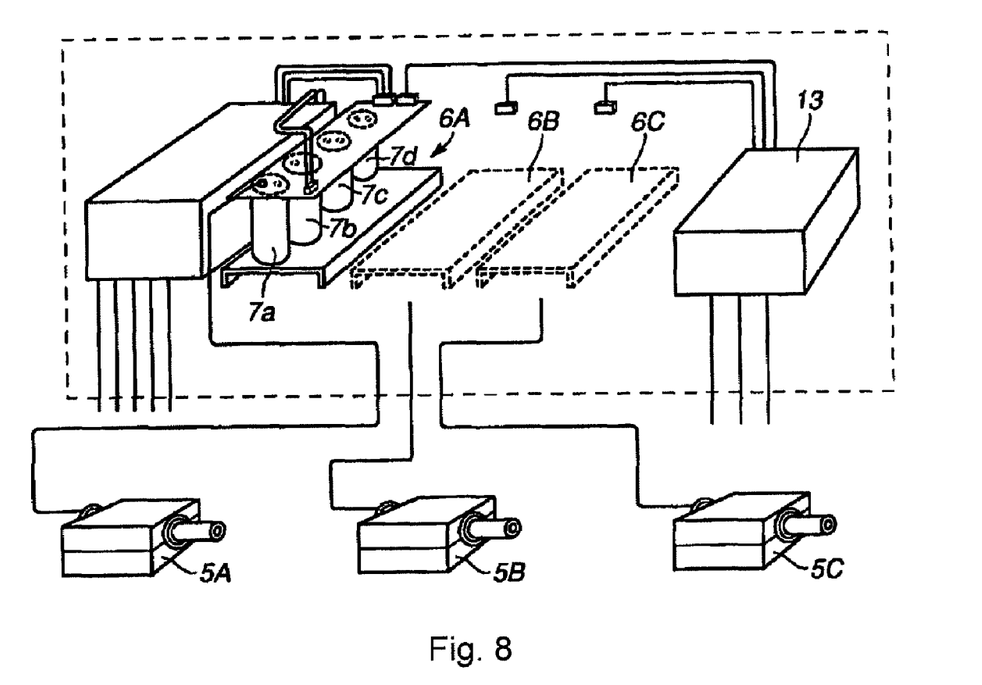
FIG. 8 illustrates an operating device for a three-phase switch.

FIG. 8 shows a complete operating device for breaking three phases with three motors 5A, 5B, 5C according to the invention. Operation of the motor 5A for phase 1 is performed via the drive circuit 6A with the capacitor packages 7a, 7b, 7c and 7d in accordance with what has been described above. In a corresponding way, the motors 5B and 5C for the other phases are operated via similar (but not shown) drive circuits 6B, 6C. The drive circuits obtain their power supply from a common current source 13.

The applications of the invented motor described above are only to be regarded as examples and it will be understood that also other applications lie within the scope of the invention.

In those cases where the motor is adapted to carry out a sequence of operating movements such as, for example breaking-making-breaking of a switch, the rotational movement of the rotor may all the time take place in the same direction. Alternatively, the direction of rotation may be reversed between the operating actions.

The invention claimed is:

1. A rotating electric motor for operating an electric component, said rotating electric motor being adapted for an operating movement during a limited predetermined angular motion of the rotor of the rotating electric motor, said rotating electric motor comprising:
an electric drive circuit for a stator winding of the rotating electric motor, the electric circuit comprising at least one branch comprising an electric energy bank and a thyristor which are connected in series with the stator winding, the at least one branch further comprising a diode connected in parallel with the electric energy bank, wherein the thyristor controls flow of current through the electric energy bank and stator winding, and wherein the electric energy bank comprises a capacitor.

2. The rotating electric motor according to claim 1, wherein the thyristor is adapted to be turned off when the rotor has carried out less than half of the angular motion.

3. The rotating electric motor according to claim 2, wherein the thyristor is adapted to be turned on again after having been turned off in order to achieve a braking phase.

4. The rotating electric motor according to claim 1, wherein said angular motion is in the interval of 155°-250°.

5. The rotating electric motor according to claim 4, wherein said angular motion is about 180°.

6. The rotating electric motor according to claim 1, wherein the thyristor is arranged to remain turned on until the electric energy bank is exhausted.

7. The rotating electric motor according to claim 1, wherein the drive circuit comprises three branches connected in parallel, each branch comprising an electric energy bank and a thyristor connected in series with the stator winding, each branch further comprising a diode connected in parallel with the electric energy bank.

8. The rotating electric motor according to claim 1, wherein the rotating electric motor is a single-phase rotating electric motor.

9. The rotating electric motor according to claim 1, wherein the rotor of the rotating electric motor is a permanent-magnetic rotor.

10. The rotating electric motor according to claim 1, wherein the rotor is a two-pole rotor.

11. A method for operating an electric component utilizing a rotational movement achieved by a rotating electric motor, the method comprising:
connecting a rotor of the rotating electric motor to the electric component,
bring the rotating electric motor to carry out a limited predetermined angular motion by driving a current through a stator winding of the rotating electric motor,
connecting a stator winding of the rotating electric motor to an electric energy bank comprising a capacitor via a thyristor, and
applying a first turn-on signal to the thyristor to cause a current to flow through from the electric energy bank through the stator winding of the rotating electric motor, thereby generating a torque on a rotor of the rotating electric motor, and
applying a second turn-on signal to the thyristor causing current to flow in a same direction as after applying the first turn-on signal, thereby reversing the torque applied on a rotor of the rotating electric motor.

12. The method according to claim 11, wherein the method is carried out using a rotating electric motor comprising an electric drive circuit for the stator winding of the rotating electric motor, wherein the electric drive circuit comprises at least one branch comprising the electric energy bank and the thyristor which are connected in series with the stator winding.

13. The method according to claim 11, wherein the method brakes or makes a current.

14. An electric switch, comprising:
an operating device comprising a rotating electric motor comprising an electric drive circuit for a stator winding of the rotating electric motor, the electric circuit comprising at least one branch comprising an electric energy bank comprising a capacitor and a thyristor which are connected in series with the stator winding, the at least one branch further comprising a diode connected in parallel with the electric energy bank, wherein the thyristor controls flow of current through the electric energy bank and stator winding.

15. A rotating electric motor for operating an electric component, said rotating electric motor being adapted for an operating movement during a limited predetermined angular motion of the rotor of the rotating electric motor, said rotating electric motor comprising:
an electric drive circuit for the stator winding of the rotating electric motor, the electric circuit comprising three branches each comprising an electric energy bank and a thyristor which are connected in series with the stator winding, each branch further comprising a diode connected in parallel with the electric energy bank.

16. A rotating electric motor for operating an electric component, said rotating electric motor being adapted for an operating movement during a limited predetermined angular motion of the rotor of the rotating electric motor, said motor comprising:
an electric drive circuit for a stator winding of the rotating electric motor, the electric circuit comprising at least one branch comprising an electric energy bank and a thyristor which are connected in series with the stator winding, the at least one branch further comprising a diode connected in parallel with the electric energy bank, wherein the thyristor controls flow of current through the electric energy bank and stator winding,
wherein the drive circuit comprises three branches connected in parallel, each branch comprising an electric energy bank and a thyristor connected in series with the stator winding, and wherein each branch further comprises a diode connected in parallel with the electric energy bank.

* * * * *